US009732556B2

(12) United States Patent
Priest et al.

(10) Patent No.: US 9,732,556 B2
(45) Date of Patent: Aug. 15, 2017

(54) TREE CLIMBING STICK

(71) Applicant: DDI, Inc., Dubuque, IA (US)

(72) Inventors: John Brian Priest, Dubuque, IA (US); Andrae T. D'Acquisto, Bellevue, IA (US)

(*) Notice: Subject to any disclaimer, the term of this patent is extended or adjusted under 35 U.S.C. 154(b) by 0 days.

(21) Appl. No.: 14/848,157

(22) Filed: Sep. 8, 2015

(65) Prior Publication Data

US 2016/0069133 A1    Mar. 10, 2016

Related U.S. Application Data

(60) Provisional application No. 62/047,036, filed on Sep. 7, 2014.

(51) Int. Cl.
| | | |
|---|---|---|
| E06C 7/00 | (2006.01) |
| E06C 1/38 | (2006.01) |
| A63B 27/00 | (2006.01) |
| E06C 1/34 | (2006.01) |
| A01M 31/02 | (2006.01) |
| E06C 1/08 | (2006.01) |
| E06C 1/387 | (2006.01) |
| E06C 7/18 | (2006.01) |

(52) U.S. Cl.
CPC ............. E06C 1/381 (2013.01); A01M 31/02 (2013.01); A63B 27/00 (2013.01); E06C 1/34 (2013.01); *A63B 2210/50* (2013.01); *E06C 1/08* (2013.01); *E06C 1/387* (2013.01); *E06C 7/188* (2013.01)

(58) Field of Classification Search
CPC ... E06C 1/381; E06C 1/04; E06C 1/08; E06C 1/10; E06C 7/08; E06C 7/081; E06C 1/34; A01M 31/02; A63B 27/02
See application file for complete search history.

(56) References Cited

U.S. PATENT DOCUMENTS

| | | | | |
|---|---|---|---|---|
| 601,849 | A * | 4/1898 | Aiken ....................... | E06C 9/04 182/92 |
| 4,655,318 | A * | 4/1987 | Bowen ..................... | E06C 9/04 182/228.1 |
| 4,844,207 | A * | 7/1989 | Andrews ................. | E06C 1/381 182/100 |
| 5,040,635 | A * | 8/1991 | Strickland ............... | E06C 1/381 182/100 |
| 5,109,954 | A * | 5/1992 | Skyba ....................... | E06C 1/10 182/100 |
| 5,439,072 | A * | 8/1995 | Jenkins, Jr. ............. | E06C 1/125 182/100 |
| 5,655,623 | A * | 8/1997 | Skyba ...................... | E06C 1/381 182/100 |
| 5,752,579 | A * | 5/1998 | Takahashi ................ | E06C 9/04 182/90 |

(Continued)

*Primary Examiner* — Daniel Cahn
(74) *Attorney, Agent, or Firm* — Rathe Lindenbaum LLP

(57) ABSTRACT

A climbing stick connector system includes first and second climbing sticks releasably secured to one another with first and second posts extending parallel to one another. In one implementation, the first climbing stick has a stopper having a shelf and a projection received within an aperture in one of the posts, wherein a step is pivotally secured to the post above the shelf by a fastener extending through the stopper. The first climbing stick has a V-shaped claw having spaced ears receiving the post therebetween, and the step has opposite upwardly facing concave edges.

16 Claims, 13 Drawing Sheets

(56) References Cited

U.S. PATENT DOCUMENTS

| | | | | |
|---|---|---|---|---|
| 5,772,358 A * | 6/1998 | Takahashi | E02D 29/12 | 182/90 |
| 5,806,626 A * | 9/1998 | Jenkins, Jr. | E06C 1/34 | 182/100 |
| 5,816,362 A * | 10/1998 | Jenkins, Jr. | E06C 1/34 | 182/100 |
| 6,068,083 A * | 5/2000 | Takahashi | E06C 7/08 | 182/90 |
| 6,547,035 B1 * | 4/2003 | D'Acquisto | A01M 31/00 | 182/100 |
| 6,969,039 B1 * | 11/2005 | Diggle, III | A63B 27/02 | 248/216.1 |
| 7,077,612 B1 * | 7/2006 | Diggle, III | A63B 27/00 | 248/303 |
| D556,917 S * | 12/2007 | Peacock | D25/69 | |
| 7,410,137 B2 * | 8/2008 | Diggle | E06C 1/34 | 248/211 |
| 8,556,035 B1 * | 10/2013 | Kendall | E06C 1/381 | 182/156 |
| 8,863,900 B1 * | 10/2014 | Bolinger | A63B 27/00 | 182/151 |
| 9,249,625 B2 * | 2/2016 | Taylor | E06C 7/143 | |
| 9,409,055 B1 * | 8/2016 | Niemela | A63B 27/00 | |
| 9,512,675 B1 * | 12/2016 | Fast | E06C 1/34 | |
| 2004/0216952 A1 * | 11/2004 | Woller | A01M 31/00 | 182/93 |
| 2008/0156588 A1 * | 7/2008 | Butcher | E06C 1/34 | 182/200 |
| 2008/0196972 A1 * | 8/2008 | Bell | E06C 1/34 | 182/92 |
| 2008/0283335 A1 * | 11/2008 | Salerno | A63B 27/00 | 182/133 |
| 2012/0125715 A1 * | 5/2012 | Furseth | E06C 1/381 | 182/194 |
| 2014/0027204 A1 * | 1/2014 | Niemela | E06C 1/04 | 182/129 |
| 2015/0060204 A1 * | 3/2015 | Walter | E06C 1/383 | 182/163 |
| 2016/0024843 A1 * | 1/2016 | Niemela | E06C 7/188 | 182/129 |

* cited by examiner

TREE CLIMBING STICK

CROSS-REFERENCE TO RELATED PATENT APPLICATIONS

The present application is a non-provisional application claiming priority from U.S. Provisional Patent Application Ser. No. 62/047,036 filed on Sep. 7, 2014 and entitled TREE CLIMBING STICK AND CAM, the full disclosure which is hereby incorporated by reference.

BACKGROUND

Tree climbing sticks are typically mounted along a tree and serve as a ladder for a person to reach a higher tree stand for wildlife observation or hunting. As such tree climbing sticks are often used in remote areas, transporting such clique tree climbing sticks and tree stands is often difficult.

DETAILED DESCRIPTION OF EXAMPLES

Figure 1:
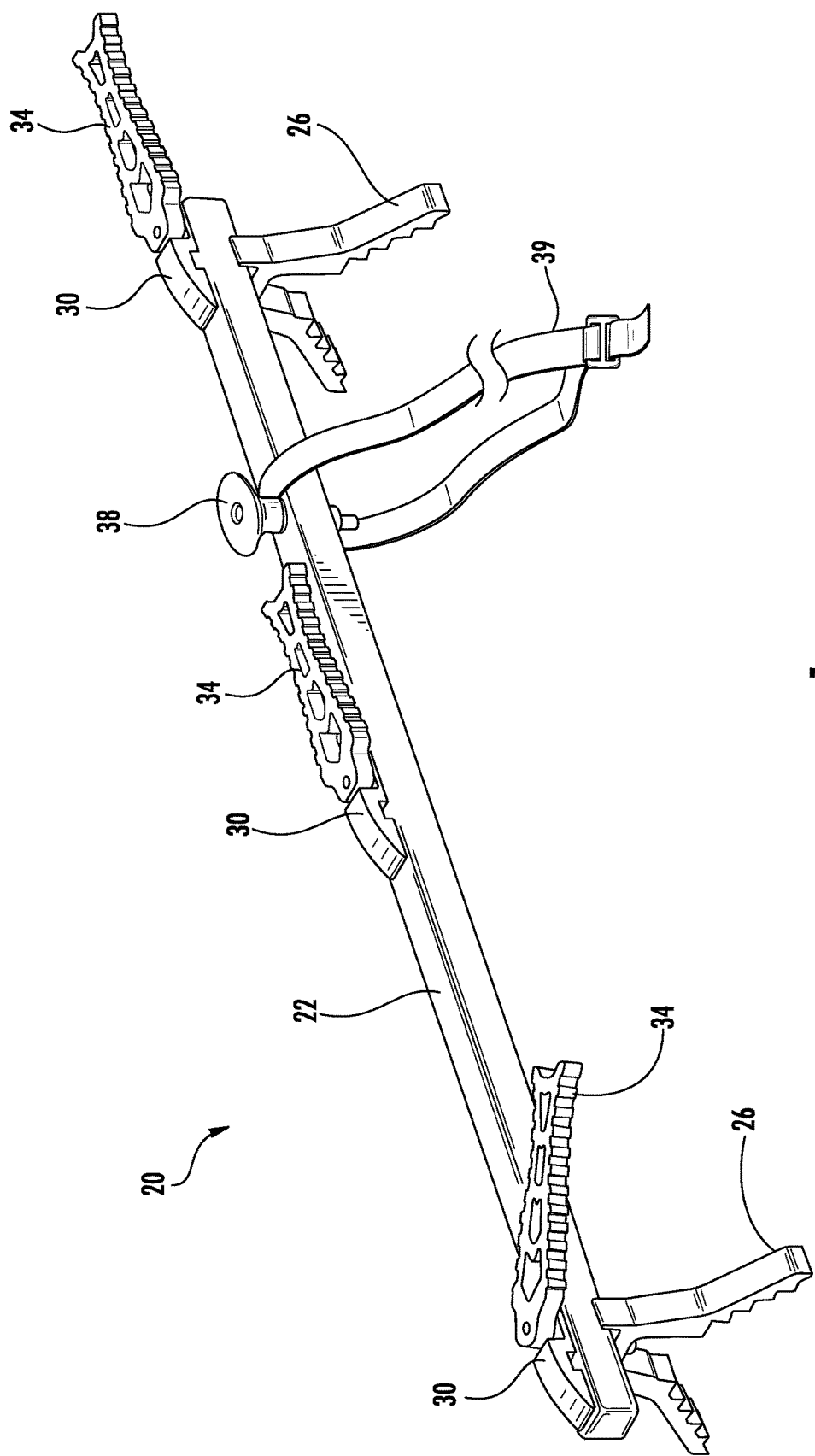
FIG. 1 is a perspective view of an example tree climbing stick.

FIG. 1 is a perspective view of an example tree climbing stick 20. Tree climbing stick 20 is structured or configured to be mounted along a tree in a vertical orientation, providing a person with a ladder to climb the tree. As will be described hereafter, tree climbing stick 20 incorporates features that facilitate easier transport of tree climbing stick 20, or multiple tree climbing sticks 20, to remote locations, such as locations where tree climbing stick 20 must be manually carried across rugged terrain. Tree climbing stick 20 additionally incorporates many features that facilitate easier use of tree climbing stick 20 and lower-cost production of climbing stick 20.

Figure 2:
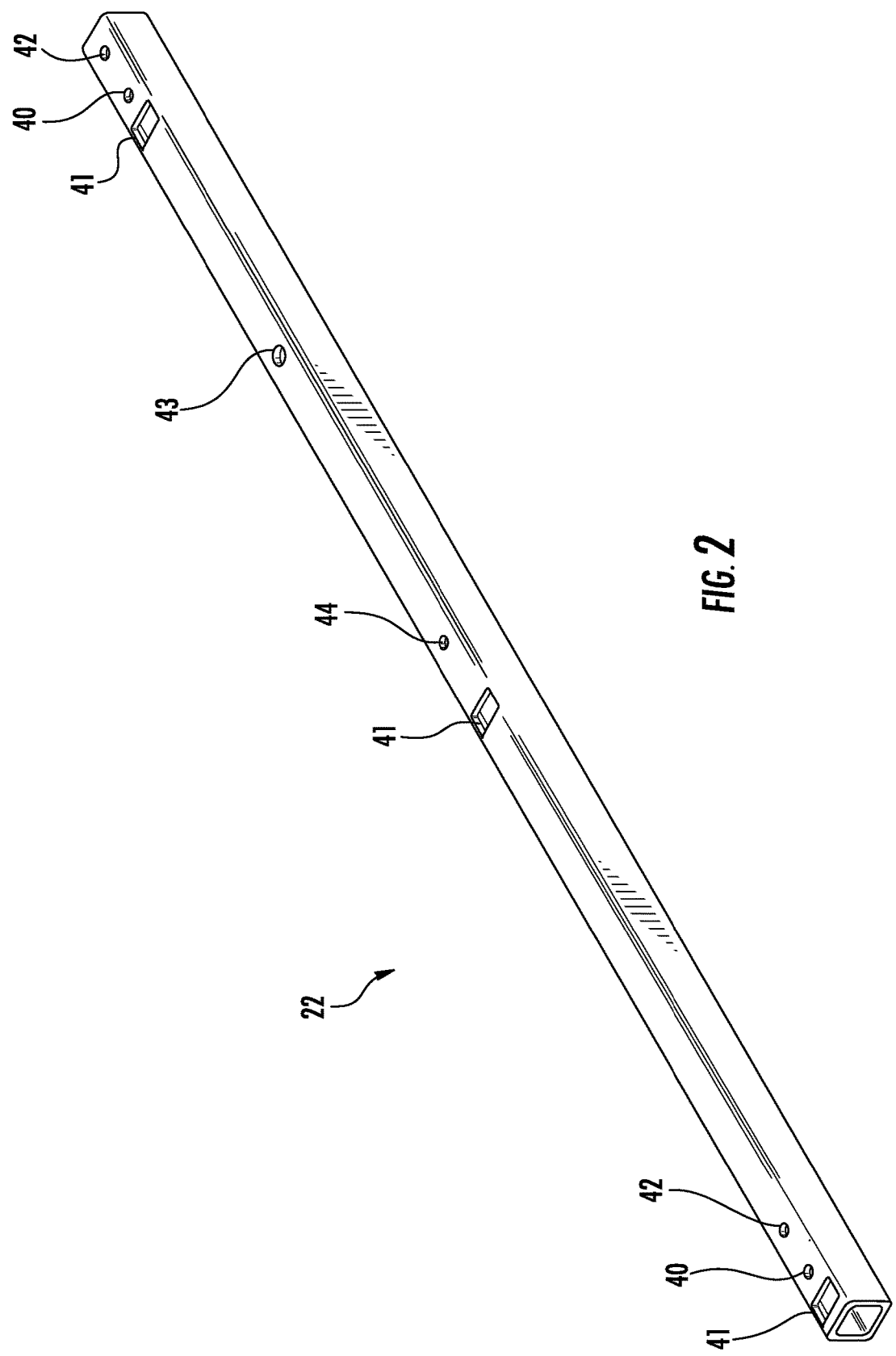
FIG. 2 is a perspective view of an example post of the tree climbing stick of FIG. 1.

Tree climbing stick 20 comprises post 22, tree gripping claws 26, step stoppers 30, steps 34, cinch mount 38 and cinch 39. Post 22 comprises an elongated structure serving as a spine or backbone for supporting claws 20 sticks, step stoppers 30, steps 34 and cinch mount 38. FIG. 2 is a perspective view of an example post 22 independent of the remaining components of stick 20. In the example shown in FIG. 2, post 22 comprises an elongated square or rectangular tube formed from a relatively strong and rigid material, such as a metal, such as aluminum or steel. In one implementation, post 22 comprises an extruded tube.

In the example illustrated, post 22 is configured to facilitate removal mounting of each of claws 26, stoppers 30, steps 34 and cinch mount 32. In the example illustrated compost 22 is configured to facilitate the use of fasteners, such as nuts and bolts, for such mounting. As shown by FIG. 2, post 22 comprises claw fastener openings 40, stopper receiving openings 41, stopper/step fastener openings 42 and cinch mount fastener openings 43. As will be described hereafter, claw fastener openings 40 comprise bores at least partially through post 22 to receive fasteners for securing a tree claws 26 to and along post 22. In the example illustrated, openings 40 comprise a pair of openings extending to opposite walls of post 22. Stopper receiving openings 41 comprise openings configured to receive a portion of stoppers 30 to secure one portion of each of stoppers 30 along post 22. Stopper/step fastener openings 42 comprise bores at least partially through post 22 through which fasteners are inserted to further secure a second portion of each of stoppers 30 to and along post 22 while also pivotally supporting a step 34. In the example illustrated, openings 42 comprise a pair of openings throughout the walls of post 42. Cinch mount opening 43 comprises a bore at least partially through post 22 to receive a fastener to secure cinch mount 38 to post 22. In the example illustrated, opening 43 comprise a pair of openings extending through opposite walls of post 22. In each of such instances, the fastener received by such openings may comprise a fastener that is either independent of the structure being secured by the fastener, such as where the fastener comprises a bolt and associated not, a screw or the like or a fastener that is integral as part of the structure being secured, such as where the structure has an integrally extending threaded shaft or an integral internally threaded bore.

Because post 22 comprises an elongated tube configured to releasably mount or releasably secure the other components such as claws 26, stoppers 30, steps 34 and cinch mount 38, the geometry of such individual parts are simplified, facilitating easier and lower-cost manufacture. For example, tube 22 may be a simple extruded tube into which openings are removed through one or more available material removal techniques. Because post 22 facilitates removal mounting of such other components of stick 20, the other components of stick 20 may be more easily replaced when worn or damaged or may be more easily exchanged when components of stick 20 are to be updated or customized.

In yet other implementations, post 22 may have other configurations. For example, in other implementations, post 22 may be integrally formed as a single unitary body with one or more of the other components of stick 20. In other implementations, post 22 may be formed through a casting process, wherein post 22 is integrally formed as a single unitary body with one or more of the other components of stick 20. In other embodiments, in lieu of comprising a tube, post 20 may comprise a single solid bar, an I-beam or other supporting structure.

Figure 3:
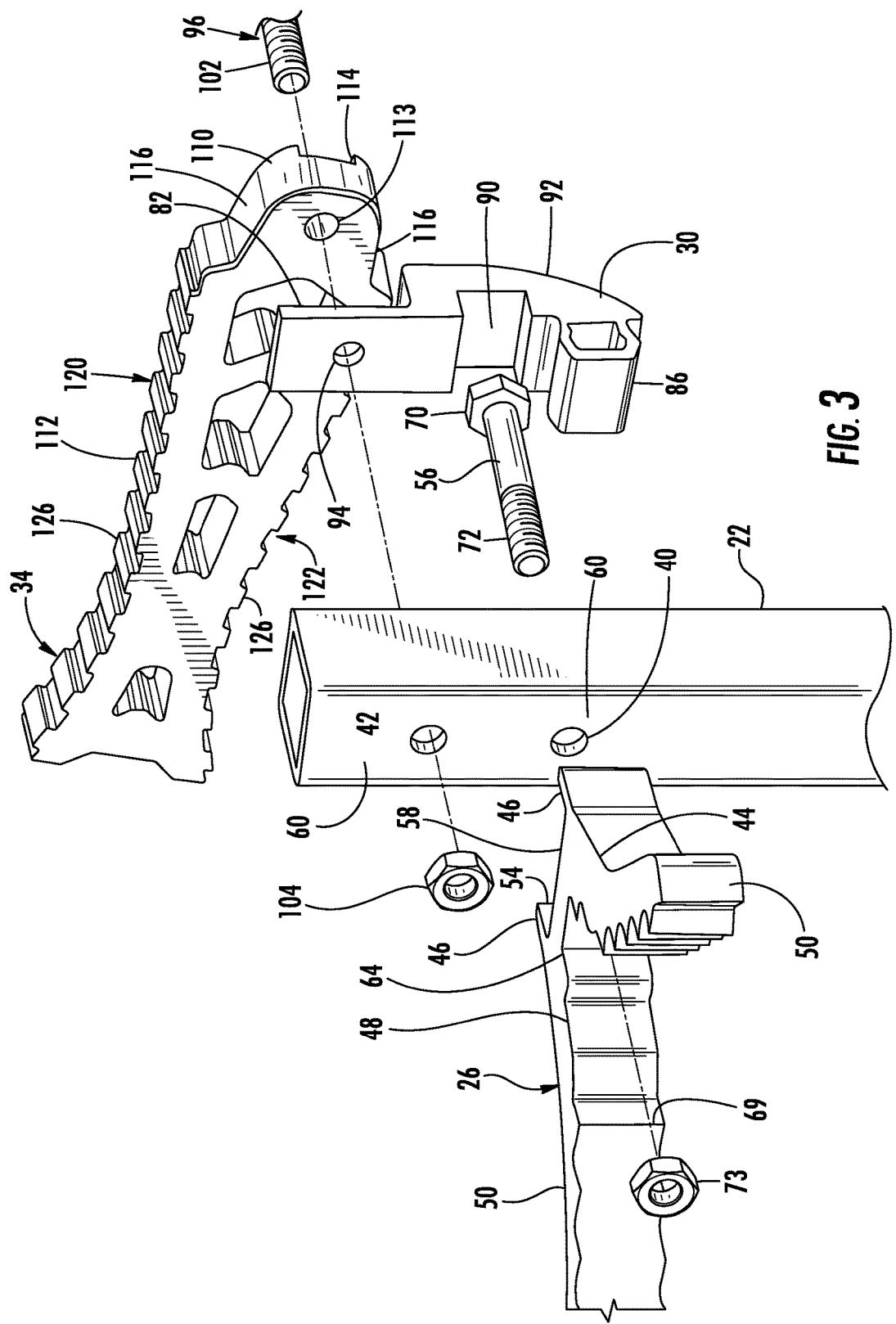
FIG. 3 is a first fragmentary exploded perspective view of a portion of the tree climbing stick of FIG. 1.
Figure 4:
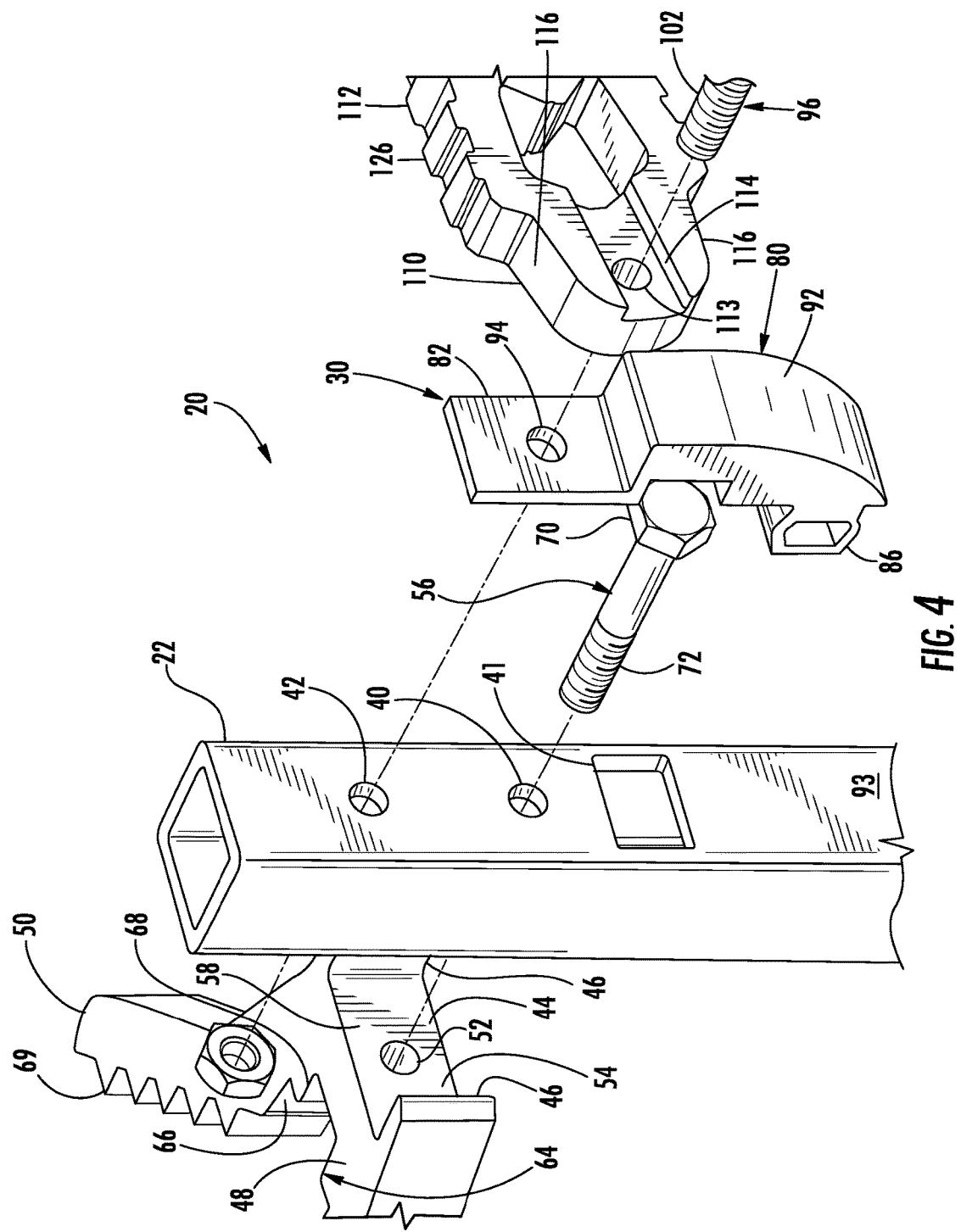
FIG. 4 is a second fragmentary exploded perspective view of the portion of the tree climbing stick of FIG. 1.
Figure 5:
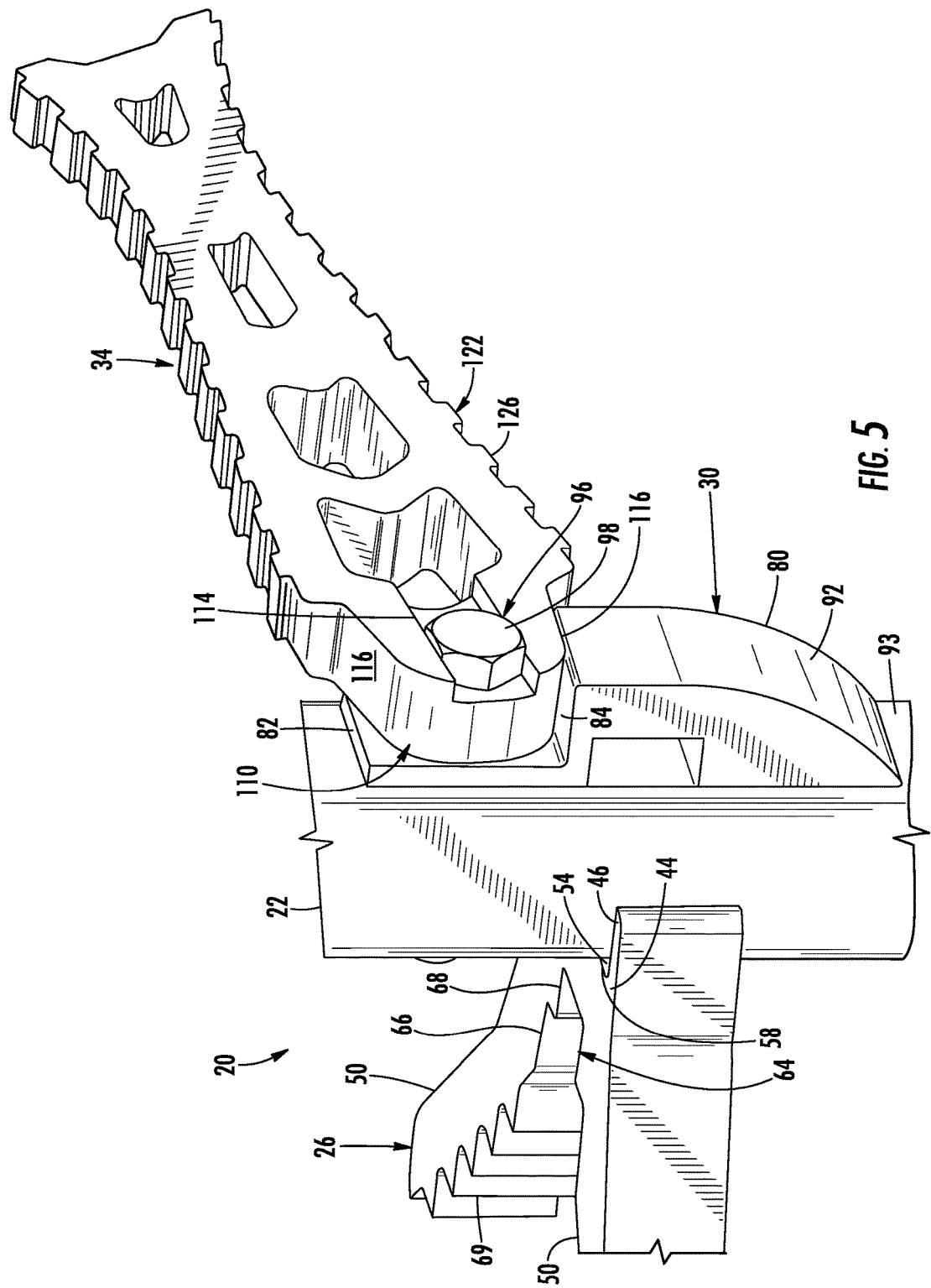
FIG. 5 is a fragmentary perspective view of the portion of the tree climbing stick of FIG. 3 upon assembly.
Figure 6:
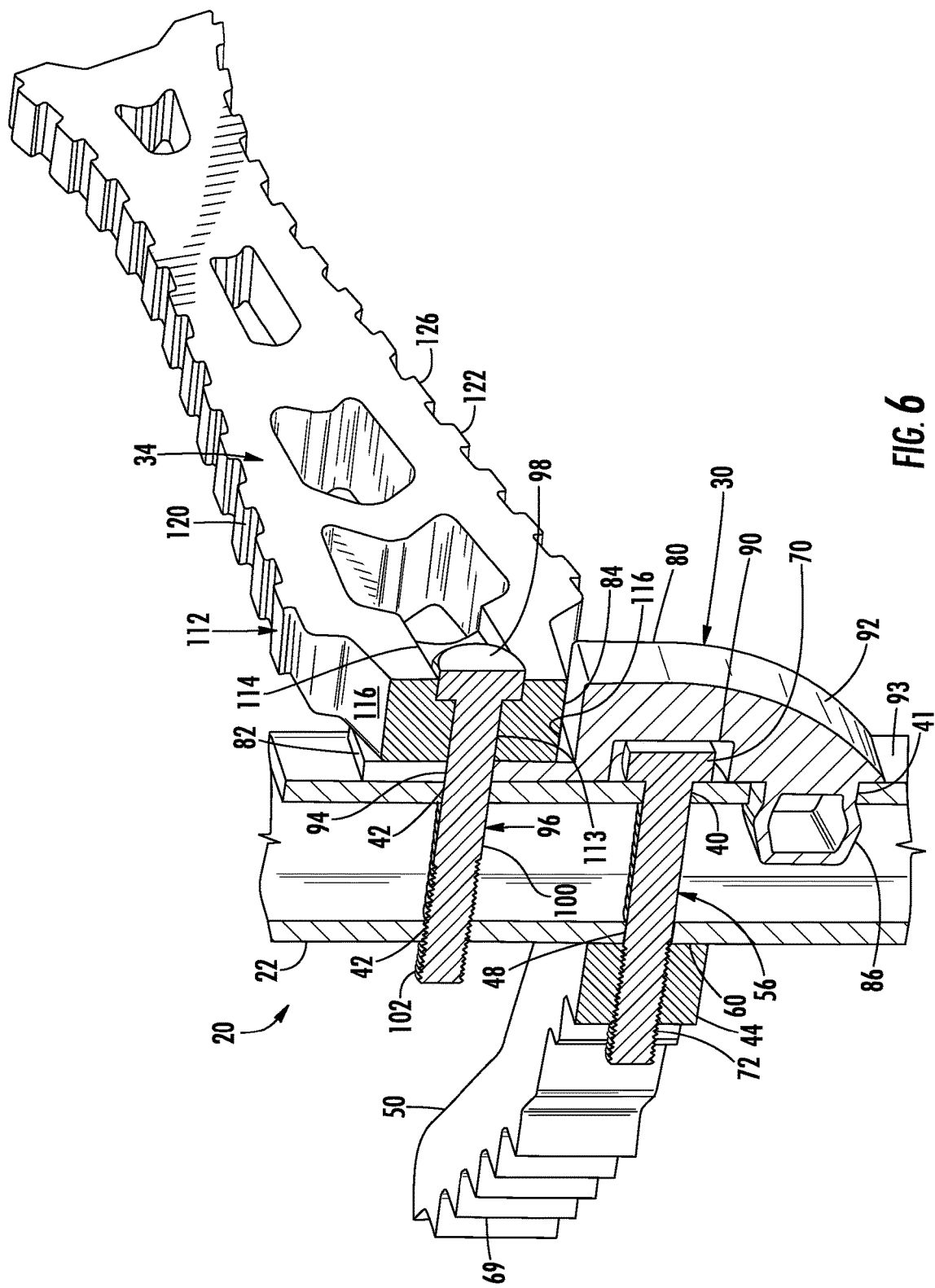
FIG. 6 is a sectional view of the portion of the tree climbing stick of FIG. 5.

FIGS. 3 and 4 are exploded perspective views illustrating an individual example tree gripping claw 26, an individual example step stopper 30 and an individual example step 34 in more detail and in relationship to the example post 22. FIG. 5 is a perspective view illustrating the individual tree gripping claw 26, the individual step stopper 30 in the individual step 34 assembled and mounted to post 22. FIG. 6 is a sectional view of the assembled portion of tree stick 22 shown in FIG. 5. As shown by FIGS. 3 and 4, tree gripping claws 26 comprise structures that engage and grip the sides of a tree to which stick 20 is to be mounted. Tree gripping claw 26 comprises a generally V-shaped bracket removably coupled or secured to post 22. Tree gripping claw 26 comprises base 44, ears 46, sidewalls 48 and wings 50. Base 44 comprises a structure having an opening 52 to receive claw fastener 56. In the example illustrated, base 44 has a rear face 58 shaped to correspond with the face 60 of post 22 such that face 58 may be positioned in close conformal abutting contact with face 60. In the example illustrated, faces 58 and 60 comprise flat planar surfaces. In other implementations, faces 58 and 60 may have other shapes.

Ears 46 project from base 44 on a first side of base 44 to form channel 54 with base 44 for forming a floor of the channel and with ears 46 forming opposite sides of the channel 54. Ears 46 wrap about opposite sides of post 22. Ears 46 inhibit rotation or pivoting of claw 26 about the axis of fastener 56 with respect to post 22. In other implementations, ears 46 may be omitted.

Sidewalls 48 project from base 44 on an opposite side of base 44 as compared to ears 46. Sidewalls 48 cooperate with base 44 to form a channel 64 facing in a direction opposite to the direction in which channel 54 faces. As will be described in more detail hereafter, channel 64 is sized and shaped to receive portions of post 22 of another climbing stick 20 being stacked relative to the illustrated climbing stick 20. In one implementation, channel 64 comprise a two-stepped channel having a first portion 66 with a first wider width to receive and accommodate a width of post 22 and a second portion 68 having a second narrower width to receive and accommodate portions of stopper 30 and/or step 34 of another adjacent climbing stick 20. Sidewalls 48 and the formed channel 64 facilitate nesting of multiple adjacently stacked climbing sticks 22 that form a climbing stick system.

Wings 50 divergently extend away from one another and away from sidewalls 48 on opposite sides of channel 64. Wings 50 form a V-shaped opening that receives the side of a tree. Each of wings 50 has mutually facing surfaces supporting teeth 69. Teeth 69 grip the sides of a tree along which stick 20 is mounted. In other implementations, wings 50 and claw 26 may have other configurations.

As shown by FIGS. 5 and 6, claw 26 is mounted to post 22 by fastener 56 which extends through and associated claw fastener opening 40 and through opening 52 in base 44 of claw 26. In the example illustrated, fastener 56 comprises a bolt having a head 70 and a threaded end portion 72 upon which a threaded nut 73 is screwed or threaded so as to capture post 22 and claw 26 between head 70 and nut 73. Nut 73 is located within a portion 60 of channel 64. In other implementations, not 73 may be located within a countersink or recess formed within base 44, within the floor of portion 68 of channel 64.

In other implementations, claw 26 may be secured to post 22 in other fashions. For example, in other implementations, threaded portion 72 may be provided on a shaft integrally extending from post 22. In yet another implementation, fastener 56 may extend through claw 26 and post 22 in an opposite fashion, wherein had 70 is located within channel 64 while nut 73 is located on an opposite side of tube 22 adjacent stopper 30.

Step stopper 30 comprises a structure configured to support and retain its associated step 34 in a horizontal state when use, when being climbed upon, while allowing the associated step 34 to be pivoted to an inactive or withdrawn state in which the associated step 34 extends parallel to the major dimension or longitudinal length of post 22, making stick 20 more compact for transport and storage by reducing the extent of projecting structures and allowing stick 20 to be more easily carried with a reduced likelihood of stick 20 catching upon external structures. In the example illustrated, step stopper 30 allows the associated step 34 to be pivoted to one of two available horizontal positions, projecting to the left or to the right of post 22. In other implementations, step stopper 30 may alternatively allow the associated step 34 to be pivoted to between the inactive orientation and only one side of post 22.

In the example illustrated, step stopper 30 is configured to be releasably mounted to post 22, facilitating simpler construction of stop 30 and post 22, facilitating easier shipment of stick 20 (in a disassembled state) and facilitating repair or replacement of stopper 30. Step stopper 30 comprises lower body 80, upper body 82, shelf 84 and projection 86. Lower body 80 extends over had 70 of fastener 56. As shown by FIG. 6, lower body 80 has a cavity 90 which receives head 70 of fastener 56. As a result, lower body 80 conceals head 70 of fastener 56 introduces the likelihood of items catching upon the edges of head 70. In the example illustrated, cavity 90 comprises a channel extending across lower body 80. In other implementations, cavity 90 may comprise a cylindrical bore drilled into lower body 80 or a polygonal opening formed or cast in lower body 80 while being sized to receive head 70. To further reduce the likelihood of external objects, clothing, bags or other articles catching upon climbing stick 20, lower body 80 further comprises a surface 92, facing in a direction away from post 22 on an opposite side of lower body 80 as cavity 90, that smoothly transitions to face 93 of post 22. In the example illustrated, surface 92 comprises an arcuate convex surface that curves to surface 93. In other implementations, surface 92 may comprise an angled tapered surface or ramp that ramps down to surface 93.

Upper body 82 extends upwards from lower body 80 and abuts face 93 of post 22 on one side and step 34 on the other side. Upper body 82 includes a bore, opening or aperture 94 for reception of a fastener 96 that secures both stopper 30 and step 34 to post 22. Upper body 82 is recessed relative to surface 92 of lower body 80 so as to form shelf 84.

Shelf 84 comprise a step or shoulder configured to abut step 34 when step 34 has been pivoted to one of the two available horizontal positions. At the same time, shelf 84 is sufficiently spaced from step 34 to allow step 34 to pivot to the withdrawn or in active state shown in FIG. 1.

Projection 86 extends from lower body 80 in a direction away from the surface 92. Projection 86 is sized and shaped to be received within aperture 41 of post 22. Projection 86 facilitates quick and tool is the initial connection of stopper 30 to post 22. Projection 86 retains stopper 30 with respect to post 22 while upper body 82 and step 34 are being secured to post 22 by fastener 96. Projection 86 cooperates with fastener 96 to provide to mounting locations to stopper 30 so as to inhibit rotation of stopper 30. In one implementation, projection 86 is integrally formed as a single unitary body with lower body 80 out of a rigid material, such as a metal, such as aluminum, wherein aperture 41 is sized larger than projection 86 to facilitate its insertion into aperture 41. In another implementation, projection 86 comprises a separate member or structure fastened are mounted to lower body 80. In one implementation, projection 86 comprises a separate member or structure, such as a knob, bulbous member, or the like, fastened or otherwise secured to lower body 80 and formed from an a resiliently flexible or elastomeric material, wherein the knob or bulbous member is sized larger than aperture 41, but resiliently compresses or flexes during insertion through after 41 so as to "pop" into place, resiliently returning to an uncompressed or default state upon full insertion, thereby retaining lower body 80 of stopper 30 to post 22.

Projection 86 and fastener 96 cooperate to secure stopper 30 to face 93 of post 22. In the example illustrated, fastener 94 comprises a bolt having a head 98, a shaft portion 100 and a threaded portion 102 which threadably receives nut 104 (shown in FIG. 3). As shown by FIG. 6, upon stopper 30 being assembled to post 22, projection 86 is received within aperture 41 and fastener 96 extends through step 34 and openings 94 and 42 such that had 98 captures step 34 and upper body portion 82 against face 93 of post 22. Threaded end portion 102 projects through the other side of post 22 and is secured in place by nut 104. As a result, fastener 96 is an employed in an arrangement such that fastener 96 serves dual functions: securing stopper 30 to post 22 also securing step 34 to post 22, reducing parts, cost and complexity of assembly. In other implementations, step 34 may be pivotably secured to post 22 at other locations and in other fashions independent of the securement of stopper 30 to post 22.

Step 34 comprises a rigid member configured to pivot relative to post 22 and stopper 30 between an inactive or withdrawn state (shown on the right side of FIG. 1) and an extended, in-use state shown in FIGS. 5 and 6, wherein step 34 rests upon shelf 84. As shown by FIGS. 1, 3 and 5, step 34 comprises base portion 110 an extension portion 112. Base portion 110 extends adjacent to stopper 30 and joins extension portion 112 to post 22 and stopper 30. In the example illustrated, base portion 110 comprises aperture 113, channel 114 and support faces 116.

Aperture 113 comprises an opening through base portion 110 sized to receive shaft 100 of fastener 96. Channel 114 comprises a recess or cavity formed within base portion 110 and sized to at least partially receive head 98 of fastener 96. Channel 114 reduces the extent to which head 98 projects beyond step 34 to reduce the likelihood of head 98 catching upon an external object. In other implementations, channel 114 may be omitted.

Support faces 116 comprise opposite surfaces on base portion 110 that are configured to abut shelf 84 when step 34 is pivoted to and extended, in-use position, extending either to the left or to the right of post 22. Support faces 116 are configured such that when the support faces 116 abut shelf 84, extension portion 112 extends substantially horizontal, substantially perpendicular to the longitudinal axis of post 22. In some implementations, faces 116 may be configured to cooperate with shelf 84 such that the centerline or longitudinal axis of extension portion 112 extends at a slightly upward inclined tilt, such as 5° to 20° above the horizontal which is perpendicular to the longitudinal axis of post 22. In other implementations, faces 116 cooperate with shelf 84 such as the centerline or longitudinal axis of extension post 112 extends perpendicular to the longitudinal axis of post 22.

As further shown by FIGS. 5 and 6, extension portion 112 of step 34 comprises two opposite edges 120, 122. Edges 120, 122 serve as a services upon which a person's foot rests when step 34 is being used. In the example illustrated, each of edges 120, 122 is irregular, not smooth, to facilitate gripping and reduce the likelihood of accidental slippage. In the example illustrated, each of edges 120, 122 comprises a series of teeth, ribs or treads 126. In the example illustrated, each of edges 120, 122 has a an overall concave shape or profile (the concave, curved or arcuate plane extending across or through the endpoints or tips of each of treads 126 on one of edges 120, 122), tending to center a person's foot between the outer tip of step 34 and base portion 110. The concavity provide an edges 120, 122 faces substantially upwards, parallel to the longitudinal centerline or axis of post 22 (the longitudinal axis extending along the major dimension of post 22). Although step 34 is illustrated as having a foot supporting surface with treads 126 and the above-noted can cavity on each of edges 120, 122, in other implementations, treads 126 and the can cavity alternatively be located on only one of edges 120, 122.

In some implementations, edges 120, 122 may have different configurations, such as different treads or teeth arrangements, allowing a person to choose which of the different available tread patterns he or she wants to use. For example in one implementation, the three steps 34 may be pivoted so as to extend left, right and left to use a first tread configuration on the steps or may be pivoted so as to extend right left right to a second different tread configuration on the steps. In still other implementations, the user may customize stick 20 by flipping each of steps 34 180° to switch between which of edges 120, 122 faces upward when the particular step is pivoted to a horizontal in use position or state. Some implementations, both faces of step 34 may include channel 114, allowing reception of head 98 a faster 96 regardless of which orientation is chosen for step 34.

Figure 6A:
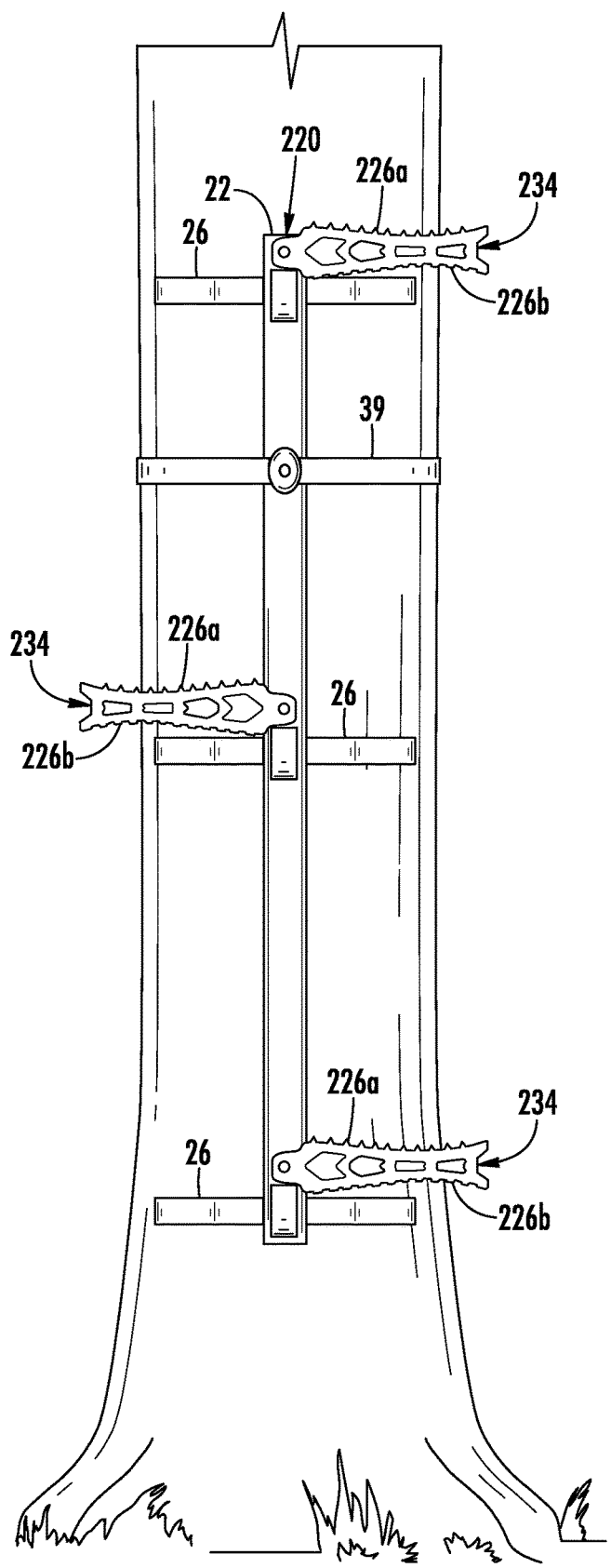
FIG. 6A is an elevational view of another example tree climbing stick secured to a tree.

FIG. 6A illustrates stick 220, another implementation of stick 20, mounted along a tree using cinch 39. Stick 220 is similar to stick 20 except that said 220 comprises steps 234, each of step 234 having differently configured treads 226A, 226B on the opposite edges 120, 122. In the example illustrated, treads 226A comprise pointed teeth having a first pitch (measured from the centerline of one tooth the centerline of another tooth) while treads 226B comprise flat ribs, similar to a square wave, having a second pitch (measured from the centerline of one rib to the centerline of another rib) that is different than the first pitch. In some implementations, the concavity and/or the tilt angle, if any, of surfaces 226A and 226B, when step 234 are supported in the extended state may also differ from one another.

Figure 7:
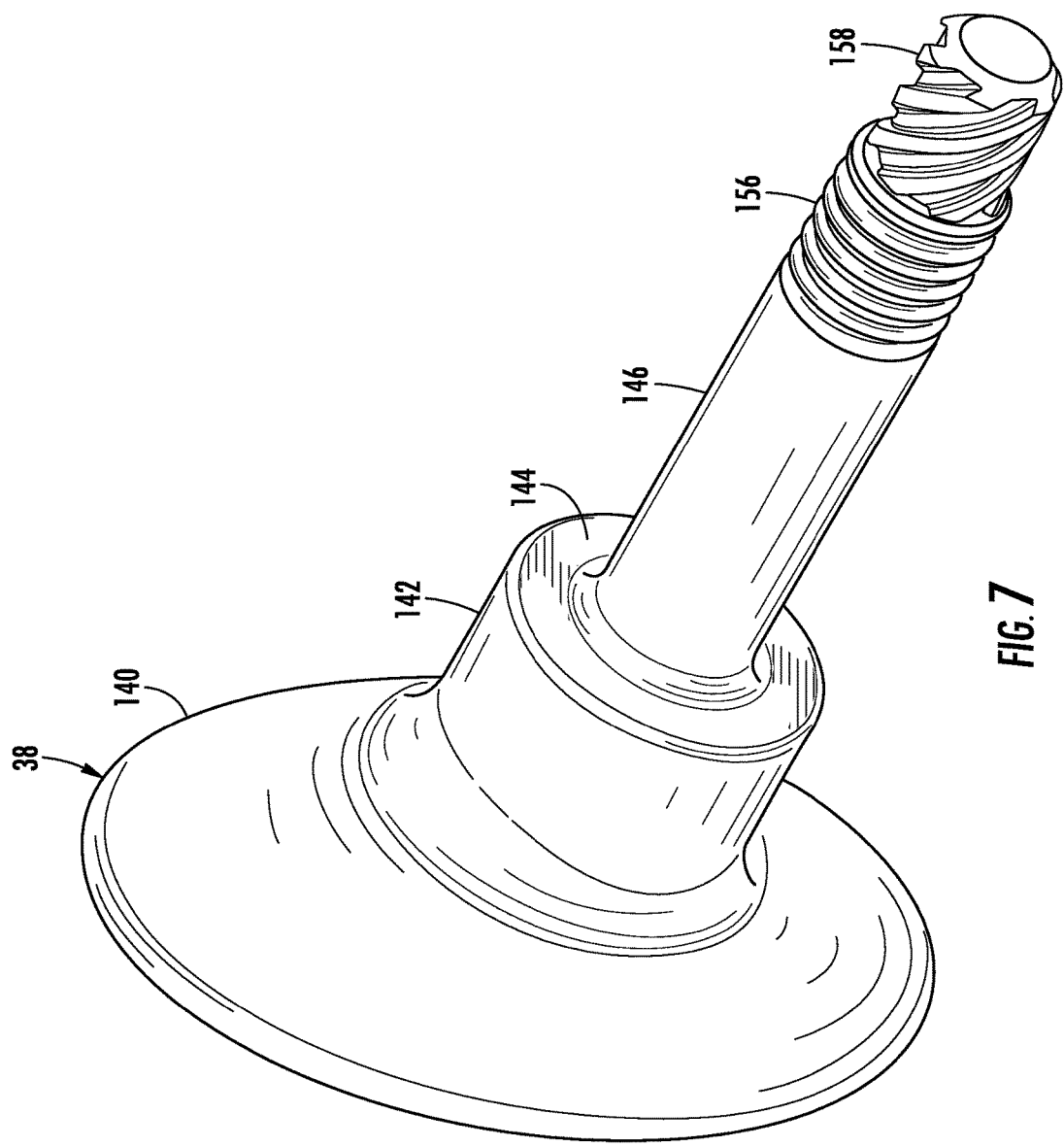
FIG. 7 is a perspective view of an example cinch mount of the tree climbing stick of FIG. 1.
Figure 8:
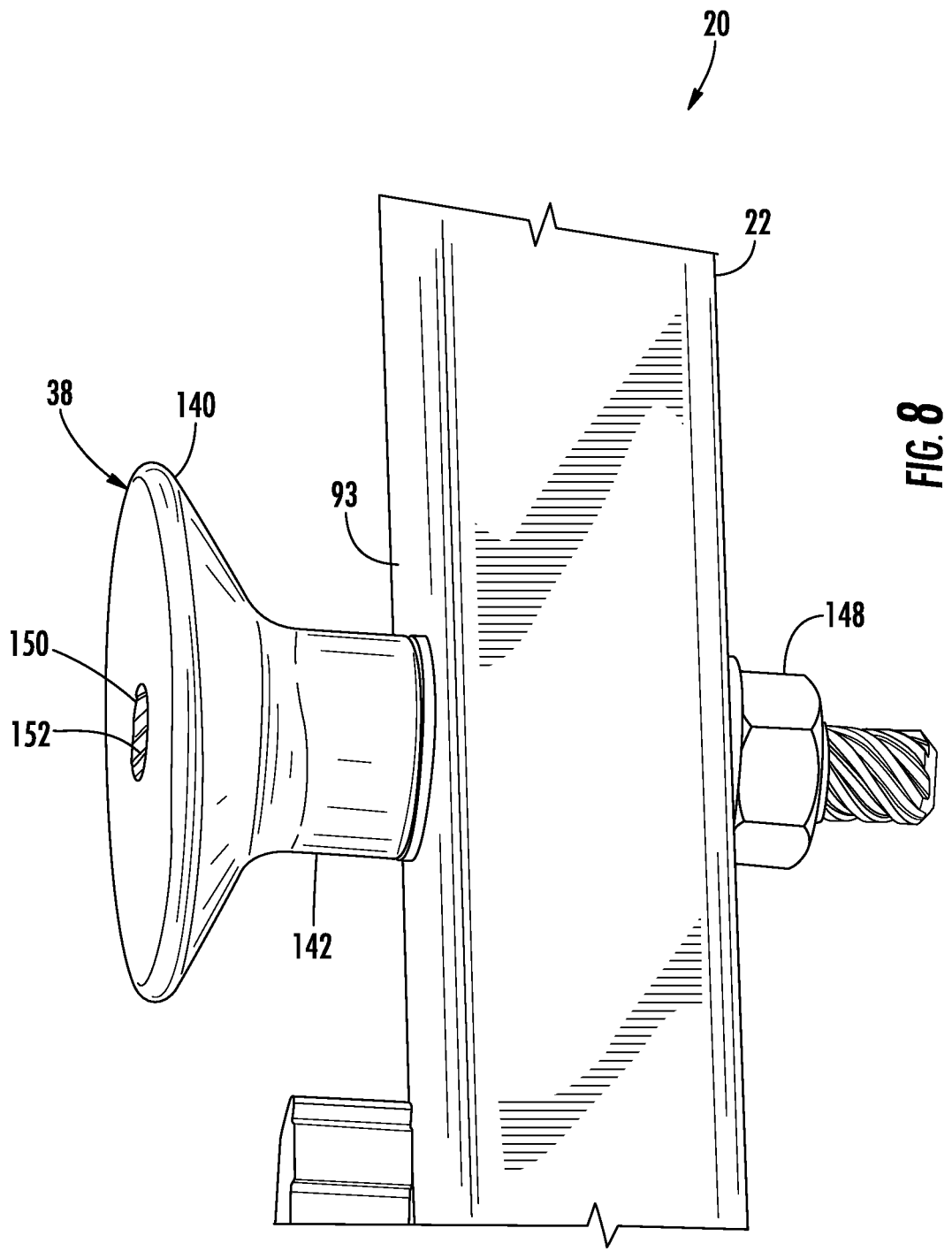
FIG. 8 is a perspective view of the cinch mount a FIG. 7 secured to the post of FIG. 2.

FIG. 7 illustrates cinch mount 38 separated from post 22. FIG. 8 illustrates cinch mount 38 mounted to post 22. As shown by FIGS. 7 and 8, the example cinch mount 38 comprises cinch retaining head 140, neck 142, shoulder 144, shaft 146 and nut 148 (shown in FIG. 8). Head 140 comprise an enlarged portion having at least one dimension larger than the adjacent portion of cinch 39 (shown in FIG. 1). Head 140 retains cinch 39 captured between post 22 and head 140. As shown by FIG. 8, had 140 comprises a connection bore 150 configured to receive and retain a connection portion of another cinch mount 38 on another tree climbing stick 20 or another tree climbing stick having cinch mount 38. In the example illustrated, connection bore 150 is internally threaded, having internal threads 152 which threadably engage corresponding threads of another cinch mount. In other implementations, connection bore 150 may have other configurations for removably receiving and retaining a connection portion of another cinch mount 38.

Neck 142 extends from head 140 and terminates at shoulder 144 area as shown by FIG. 8, upon insertion of shaft 146 through cinch mount openings 43 (shown in FIG. 2), shoulder 144 abuts face 93 of post 22 with neck 142 extending between face 93 and head 140. Shaft 146 extends from shoulder 144 has a length for extending through post 22. Shaft 146 comprises a threaded portion 156 and connection portion 158.

Threaded portion 156 comprises an external thread extending between shoulder 144 and connection portion 158. Threaded portion 156 is configured to threadably engage the threaded internal bore of nut 148. Not 148, threaded portion 156 and shoulder 144 cooperate to capture post 22 between shoulder 144 and nut 148 to retain cinch mount 38 in place, through openings 43. In other implementations, other mechanisms may be used to secure cinch mount 38 to post 22. For example, in another implementation, shaft 146 may omit threaded portion 156 and alternatively include an opening for reception of a cotter pin.

Connection portion 158 is configured to be removably received within connection bore 150 of another cinch mount 38 or another cinch mount also having a connection bore. In the example illustrated, connection portion 158 comprise a second external threaded portion of shaft 146, wherein the threads of connection portion 158 correspond to threads 152 of connection bore 150 to facilitate screwing of connection portion 158 into connection bore 152 to releasably secure and retain cinch mount 38 in alignment with and to another cinch mount 38.

Figure 9:
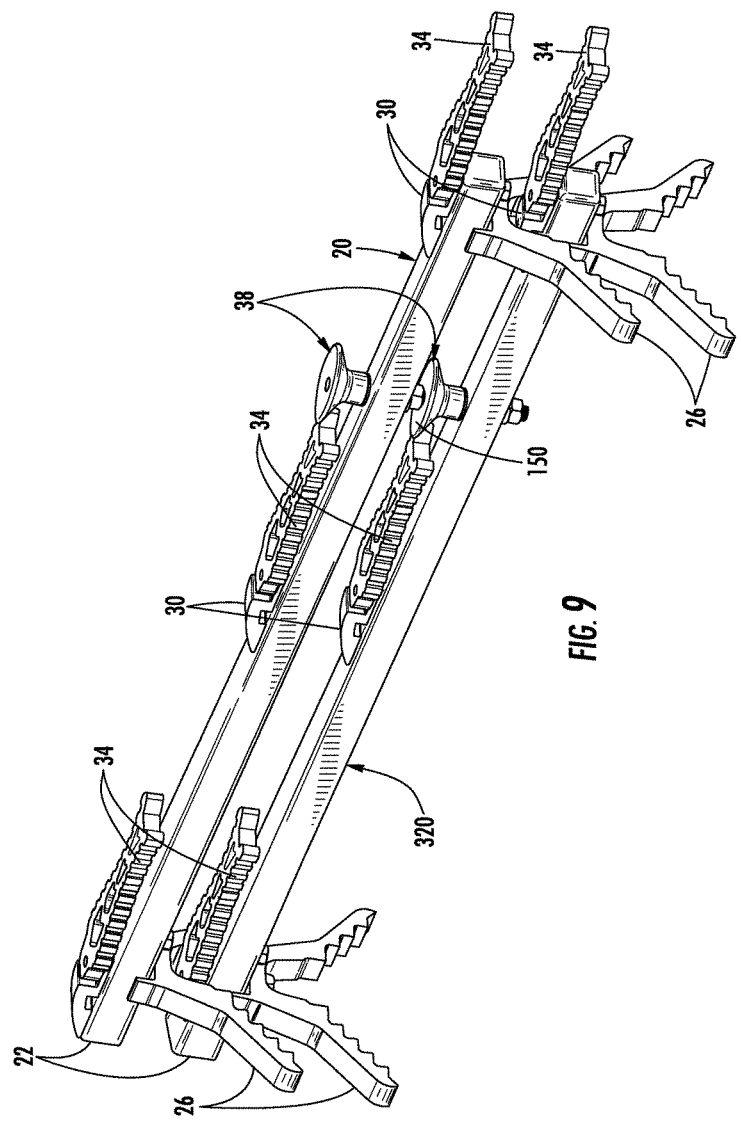
FIG. 9 is a perspective view of the tree climbing stick of FIG. 1 joined to another identical tree climbing stick by the cinch mount of FIG. 8.

FIG. 9 illustrates two identical tree climbing sticks 20 and 320 releasably joined or connected to one another by their respective cinch mounts 38. In particular, FIG. 9 illustrates a connection portion 158 of the cinch mount 38 of stick 20 screwed or threaded into connection bore 150 of the cinch mount 38 of tree climbing stick 320. In the example illustrated, cinch mounts 38 serve as first and second connection members for releasably connecting their respective tree climbing sticks 20 and 320. In the example illustrated, connection portion 158 of cinch mount 38 of stick 20 is supported by shaft 146 which extends through its respective post and which is rotatable about his own centerline or longitudinal axis between a connecting state in which connection portion 158 engages cinch mount 38 (the second connection member) of stick 320 to secure sticks 20 and 320 to one another and a disconnected state in which connection portion 158 is disengaged from cinch mount 38 of stick 322 facilitates separation of sticks 20 and 20 from one another. In the example illustrated, shaft 146 is dual purposed: supporting connection portion 158 while also serving to facilitate mounting of cinch mount 38 to the respective post. In other implementations, shaft 146 and connection portion 158 may have other configurations.

Figure 10:
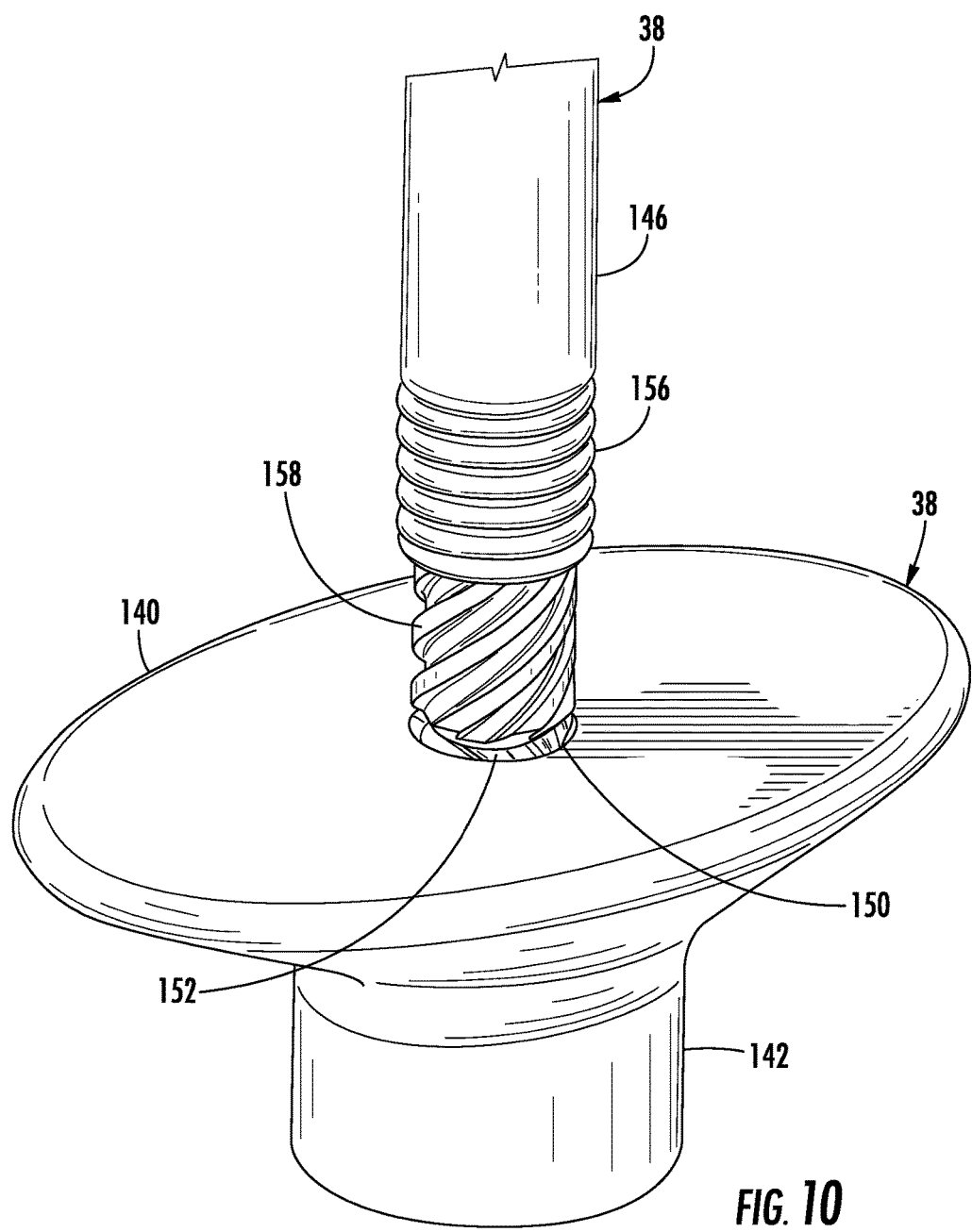
FIG. 10 is a fragmentary perspective view illustrating alignment of the example cinch mount of FIG. 7 with another identical cinch mount of another tree climbing stick.
Figure 11:
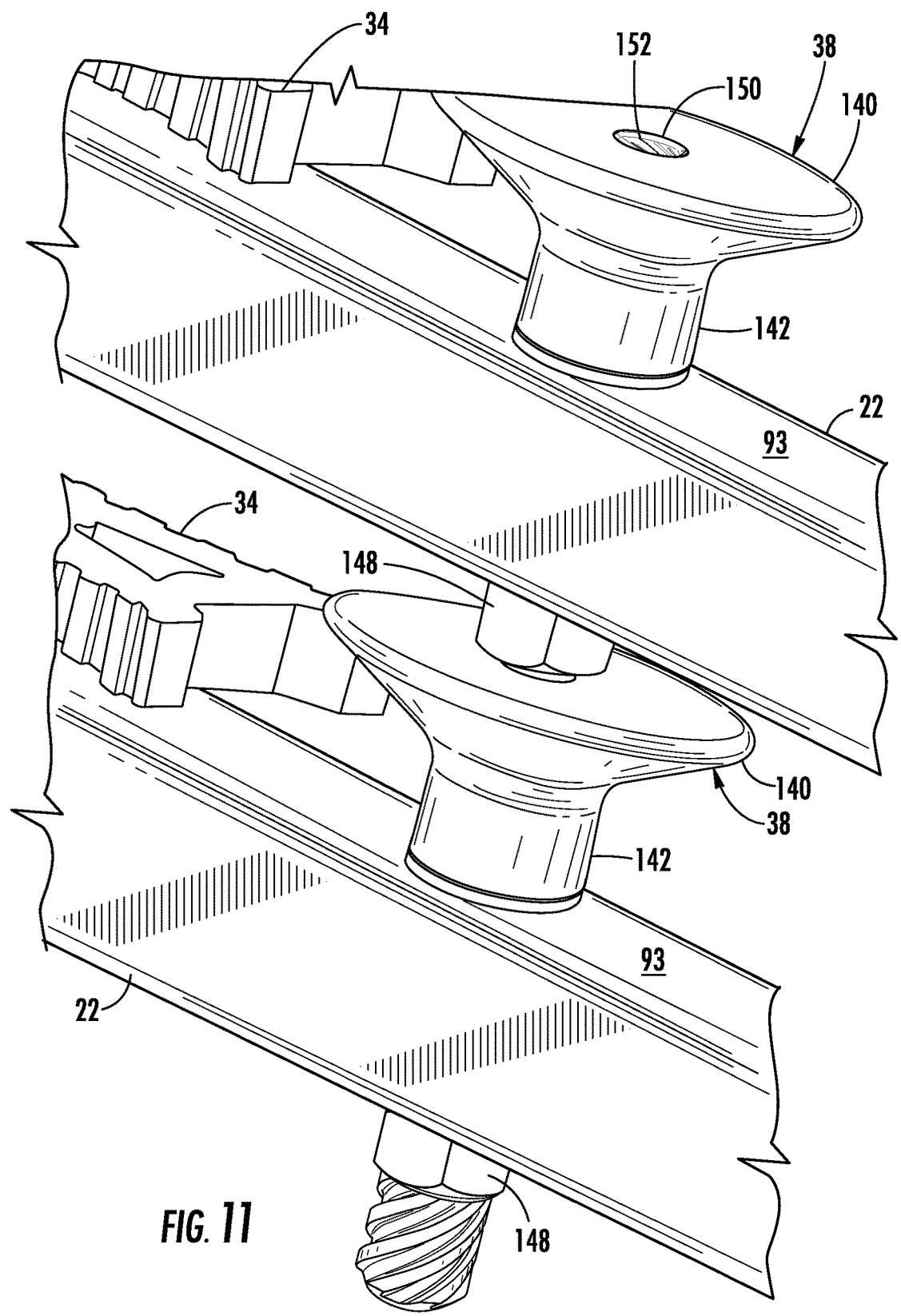
FIG. 11 is an enlarged fragmentary perspective view of the connected tree climbing sticks of FIG. 9.

As shown by FIG. 9, cinch mount 38 facilitates connection of its respective stick 20, 320 to another stick 20, 320 without additional pieces and without the need for additional tools. To screw connection portion 158 on a first cinch mount 38 into the connection bore 150 of a second cinch mount 38, the user simply aligns connection portion 158 of one cinch mount with connection bore 150 of another cinch mount (as shown in FIG. 10, without nut 148 for purposes of illustration)), grasps head portion 140 of the first cinch mount 38, and rotates the first cinch mount 38 to screw connection portion 158 of the first cinch mount 38 into the connection bore 152 of the second cinch mount 38. As a result, the two tree climbing 620, 320 are releasably joined to one another (as shown in more detail in FIG. 11) to facilitate ease of transport and compact storage.

In other implementations, connection portion 158 and connection bore 150 may have other configurations that facilitate removable or releasable retention of one cinch mount 38 with respect to another cinch mount 38 to facilitate connection of sticks 20, 320. For example, in another implementation, connection portion 158 alternatively comprise a series of first ratchet teeth spaced along the exterior of shaft 146 while connection bore 152 includes a corresponding series of second ratchet teeth spaced along the interior of bore 150, wherein the first ratchet teeth and/or the second ratchet teeth are formed from a resiliently flexible rubber-like material having a sufficient degree of flexibility such that the connection portion 158 may be manually inserted into connection bore 150 with sufficient force to deflect those ratchet teeth that are resiliently flexible and wherein the resiliently flexible teeth have a sufficient stiffness so as to not flex in response to lesser forces to prevent unintended or accidental withdrawal of connection portion 158 from connection bore 150. In other words, once inserted into connection bore 150, connection portion 158 retains in place unless intentionally pulled out by user manually pulling apart the two sticks 20, 320 with a manual force that is greater than other accidental forces which may be placed upon 20, 320 during typical transport and storage.

In the example illustrated in which connection portion 158 is externally threaded, the threads of connection portion 158 have helix angle that is different from the helix angle of threaded portion 156. In the example illustrated, the helix angle and pitch of connection portion 158 are much greater than the helix angle and pitch of threaded portion 156, allowing connection portion 1582B threaded or screwed into connection bore 152 in much fewer turns or portions of a revolution as compared to that required to thread nut 148 onto threaded portion 156. As a result, connection portion 158 may be more quickly screwed into bore 150 or more quickly unscrewed and removed from bore 150. In the example illustrated, the major diameter of the threads of connection portion 158 is less than the major diameter of the threads of threaded portion 156, allowing not 1482 past and move across connection portion 158 prior to being threaded onto threaded portion 156. In other implementations, the threads of connection portion 158 are identical to the threads of connection portion 156.

In the example illustrated, shaft 46, threaded portion 156 (or an alternative retainer as discussed above) and connection portion 158 are integrally formed as a single unitary body with neck 142 and head 140. As a result, cinch mount 38 may be formed as a single unitary piece require less assembly and providing fewer abutting interfaces that might rub or contact against one another and create undesirable noise during hunting or wildlife observation. In other implementations, cinch mount 3884 for multiple pieces. For example, in another implementation, shaft 146, with threaded portion 156 and connection portion 158, may be in the form of a bolt having star, oval, polygonal or other irregular shaped head that is axially received within a corresponding star, oval, polygonal or other irregular shaped bore formed within neck 142 and/or head 140, allowing the "bolt" to be axially inserted into the bore while preventing rotation of the "bolt" once in the bore. In one implementation, the head of such a "bolt" may include connection bore 150. In another implementation, the connection bore 150 is formed in head 140, distinct from the irregular shaped bore that receives the head of the "bolt". In yet other implementations, cinch mount 38 may have other configurations.

Figure 12:
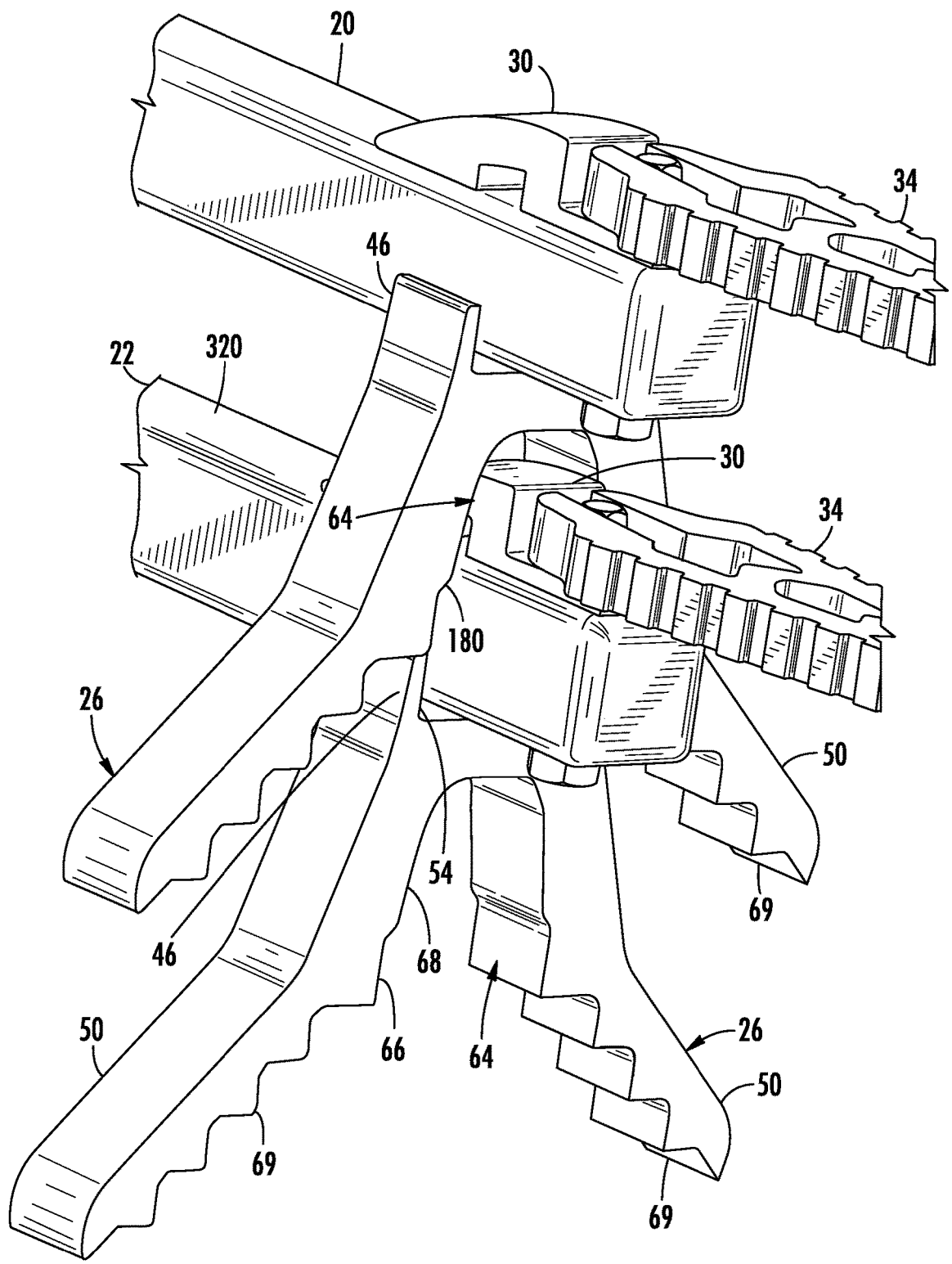
FIG. 12 is an enlarged fragmentary perspective view of another portion of the connected tree climbing sticks of FIG. 9.

FIG. 12 further illustrates how tree climbing sticks 20 and 320 are configured for nesting and stacking with one another. In particular, as shown by FIG. 12, when connected to one another by cinch mount 38, channel 64 of claw 26 of stick 20 receives post 22 of claw 320. In the example illustrated, channel 64 of claw 26 of stick 20 additionally receives portions of stopper 30 as well as ears 46 of the claw 26 of stick 320. In the example illustrated, the wider portion 66 of channel 64 receives both post 22 and ears 46 of claw 26 wrapped about opposite sides of post 22 of stick 320. The narrower portion 68 of channel 64 receives post 22 and stopper 30. In the example illustrated, Channel 64 includes a shoulder 180 interconnecting portions 66 and 68, wherein shoulder 180 bears against the tips or ends of ears 46, wherein portions of channel 64 below shoulder 180 (channel portion 66) abut or contact sides of ears 46 and wherein the portions above shoulder 180 (channel portion 68) abut or contact the sides of post 22 to provide an end stop when stick 320 is being nested within stick 20 and two facilitate multiple contact points between sticks 20 and 320 for a more tightly compact connected assembly, less likely to shift, rattle or move relative to one another during transport. In other implementations, cinch mount 3880 utilized to mount or connect 620 and 320 to one another without nesting of sticks 20 and 320.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:
1. A climbing stick system comprising:
a first climbing stick comprising a first post;
a second climbing stick having a second post, the second post extending parallel to the first post, the second climbing stick being configured to directly attach collinearly to the first climbing stick so that a major length of the first post is collinear with a major length of the second post to allow a user to ascend and descend longer distances on the climbing stick system;
a first connection member rotatably supported by the first post, wherein the first connection member is rotatable between a connecting state connecting the first climbing stick to the second climbing stick so that the major lengths are spaced apart while substantially parallel to each other and a disconnected state that facilitates separation of the first climbing stick from the second climbing stick; and
a second connection member carried by the second post, wherein the first connection member engages the second connection member when rotated to the connecting state to inhibit separation of the first climbing stick and the second climbing stick and wherein the first connection member is disengaged from the second connection member rotated to the disconnected state to facilitate separation of the first climbing stick and the second climbing stick, wherein the first connection member comprises a first cinch mount multi-stick connector comprising:
a first cinch retaining head;
a first neck extending between the first cinch retaining head and a first side of the first post;
a first shaft extending from the first neck through the first post, the first shaft having a threaded portion projecting beyond a second side of the first post and a connection portion projecting beyond the second side of the first post; and
a first nut threaded onto the first threaded portion; and
wherein the second connection member comprises a second cinch mount multi-stick connector comprising:
a second cinch retaining head having a connection bore releasably securing the connection portion of the first shaft within the connection bore;
a second neck extending between the second cinch retaining head and a first side of the second post;
a second shaft extending from the second neck through the second post, the second shaft having a third threaded portion projecting beyond a second side of the second post; and
a second nut threaded onto the third threaded portion.

2. The climbing stick system of claim 1, wherein the first climbing stick further comprises a claw, the claw comprising:
a channel receiving the second post; and
divergent wings extending from opposite sides of the channel, the
divergent wings having tree gripping teeth.

3. The climbing stick system of claim 2, wherein the claw further comprises spaced ears receiving the first post therebetween.

4. The climbing stick system of claim 1, wherein the first connection member and the second connection member are identical in shape.

5. The climbing stick system of claim 1, wherein the connection portion and the connection bore are threaded.

6. The climbing stick system of claim 1, wherein the connection portion comprises external helical threads and wherein the connection bore comprises internal helical threads corresponding to the external helical threads.

7. The climbing stick system of claim 1, wherein the first climbing stick further comprises:
an aperture through the first post;
a stopper comprising both a projection received within the aperture and a shelf; and
a step pivotably secured to the first post above the shelf by a fastener extending through the stopper.

8. The climbing stick system of claim 7, wherein the stopper extends on the first side of the first post, the climbing stick system further comprising a tree gripping claw on the second side of the first post located opposite of the first side of the first post, the tree gripping claw secured to the first post by a second fastener.

9. The climbing stick system of claim 7, wherein the stopper covers an end portion of a second fastener.

10. The climbing stick system of claim 1, wherein the first climbing stick comprises a step extending from the first post, the step having a topmost surface substantially along an entire length of the step and a bottommost surface substantially along the entire length of the step, wherein the topmost surface has a first concave profile facing in a first direction and wherein the bottommost surface has a second concave profile facing in a second direction opposite the first direction.

11. A climbing stick comprising:
a post having an aperture;
a stopper comprising a projection received within the aperture, and a shelf;
a fastener extending through the stopper and the post;
a step pivotably secured to the post by the fastener, the step being configured to pivot about an axis defined by a major length of the fastener and positioned above the shelf, wherein the step is configured to pivot between a withdrawn position and an extended position in which the step contacts and rests upon the shelf, wherein a major length of the step in the withdrawn position is substantially orthogonal to the major length of the step in the extended position, and wherein the step in the extended position is configured to allow a user to stand thereon to ascend and descend the climbing stick during use;
a tree gripping claw secured to the post with a second fastener extending through the post, the stopper covering an end portion of the second fastener, wherein the end portion of the second fastener is a hexagon received within a recess of the stopper so that the stopper contacts a perimeter of the hexagon in a manner which inhibits rotation of the second fastener while the hexagon is covered by the stopper;
a connector configured to attach to and configured to retain a fastening element of another climbing stick.

12. The climbing stick of claim 11 further comprising a cinch mount multi-stick connector being said connector, the connector comprising a neck portion adjacent to and extending from the post, a head portion extending from the neck portion and spaced from the post by the neck portion and an aperture through a top of the head portion to removably receive and retain a fastener extending from another climbing stick.

13. The climbing stick of claim 11 further comprising a first cinch mount multi-stick connector being said connector comprising:
a cinch retaining head;
a connection bore through a top of the cinch retaining head;
a neck extending between the cinch retaining head and a first side of the post;
a shaft extending from the neck through the post, the shaft having a threaded portion projecting beyond a second side of the post and a connection portion projecting beyond the second side of the post, wherein the cinch retaining head, the neck and the shaft are integrally formed as a single unitary body; and
a first nut threaded onto the threaded portion.

14. The climbing stick of claim 13, wherein the connection portion comprises external helical threads and wherein the connection bore comprises internal helical threads corresponding to the external helical threads.

15. The climbing stick of claim 11, wherein the projection and the shelf of the stopper are integrally formed as a single unitary body.

16. The climbing stick of claim 11, wherein the recess is located between the projection and the shelf.

* * * * *